April 8, 1941.   F. G. JOHNSON   2,238,022
INSULATING MATERIAL AND STRUCTURE
Filed April 3, 1937
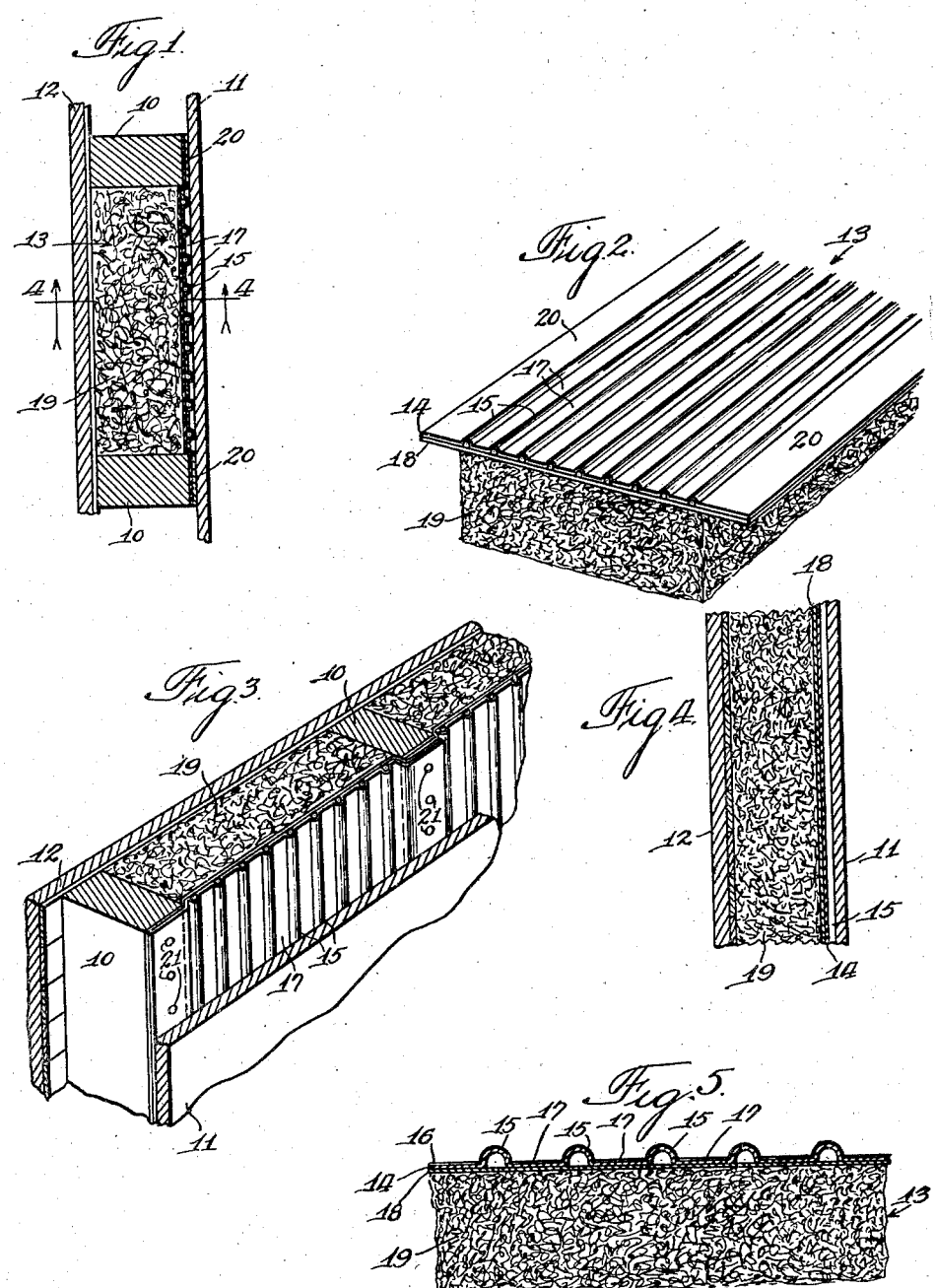

Patented Apr. 8, 1941

2,238,022

UNITED STATES PATENT OFFICE 2,238,022

INSULATING MATERIAL AND STRUCTURE

Fred Gerald Johnson, Chicago, Ill., assignor to United States Gypsum Company, Chicago, Ill., a corporation of Illinois Application April 3, 1937, Serial No. 134,701

11 Claims. (Cl. 20—4)

My invention relates to heat insulating structures such as walls and the like, more particularly to heat insulating walls having inner and outer coverings defining a hollow space therebetween with heat insulating units or materials disposed in the hollow space, and has for an object the provision of an improved, inexpensive and highly efficient insulating structure of this character.

Wall structures have heretofore been provided with bodies of porous heat insulation disposed in the hollow spaces between the inner and outer coverings, and it has likewise been proposed to utilize in such wall structures metallic foil or other material having a reflective surface either alone or in conjunction with bodies of heat insulation for minimizing the transfer of radiant heat through the wall structure.

Ordinarily the insulation used in the wall space is pre-formed as a unit and then inserted in the wall. The amount of insulation used and the spacing of the insulation relative to the wall coverings determines to a large extent the efficiency of the wall structure in preventing the passage of heat. Since the installation of these insulating materials is in many cases carried out by persons relatively unfamiliar with the principles involved, faulty or improper insulation often occurs. For example, in connection with full-coated bodies of porous insulating material, it is desirable in order to provide a maximum degree of insulation that the reflective surface of the foil be spaced a predetermined distance from the adjacent wall covering. Ordinarily the metallic foil forms a support for the body of insulation, and if the space between the foil and the adjacent wall covering is too large, the body of insulation may be unduly compressed and also the efficiency of the foil as a reflecting agent may be reduced. On the other hand, if the foil is located too closely adjacent the wall covering it may come into face to face contact with the covering and thus cause considerable heat loss by conduction.

Something is yet to be desired, therefore, in insulating wall structures of this character, and it is a further object of my invention to provide a foil-coated insulation unit for wall structures, which unit may be accurately and quickly installed in the hollow spaces of the wall for providing a maximum degree of insulation.

In carrying out my invention in one form, I provide a wall structure having inner and outer coverings with a hollow space therebetween, a corrugated sheet having a reflective surface mounted in the hollow space with the crests of the corrugations on the reflective surface contacting one of the wall coverings at spaced intervals to provide uniform air spaces between the covering and the major portion of the reflective surface and a body of light, porous heat insulation material adhesively secured to the opposite surface of the corrugated sheet so as substantially to fill the hollow space.

More specifically, the corrugated sheet comprises metallic foil indented at spaced intervals to provide a plurality of substantially parallel hollow ribs, the portions of the metallic foil between the ribs being substantially flat and constituting the major portion of the sheet. A backing member is provided for the foil, which member extends across the base of each of the hollow ribs and is adhesively secured to the flat portions of the sheet to prevent transverse deformation of the ribs, and the backing member and the foil are mounted in the hollow space with the crests of the ribs on the metallic foil contacting the wall covering which is subjected to the higher temperature. The space between the backing member and the wall covering subjected to a lower temperature, is substantially completely filled with a body of porous mineral wool adhesively secured to the backing member. Thus the metallic foil substantially seals the hollow space against the entry of moisture through the higher temperature covering and the body of mineral wool permits ready diffusion of water vapor therethrough to the lower temperature covering, substantially all condensation of the water vapor contained in the wall thereby taking place on the lower temperature covering.

For a more complete understanding of my invention reference may now be had to the drawing, in which Figure 1 is a horizontal sectional view of a wall structure embodying my invention;

Fig. 2 is a fragmentary perspective view of a preformed insulation unit for use in the wall structure shown in Fig. 1;

Fig. 3 is a fragmentary perspective view of a portion of the wall structure with the inner covering member broken away to illustrate more clearly the construction;

Fig. 4 is a sectional view taken along the line 4—4 of Fig. 1; and

Fig. 5 is an enlarged fragmentary view of the insulation shown in Fig. 2.

Referring now to the drawing, in the preferred embodiment of my invention shown, the wall structure includes the usual spaced studding or supporting members 10, and inner and outer covering members 11 and 12, respectively, defining a hollow wall spaced therebetween in which is disposed a pre-formed insulation unit 13, the construction of which is shown best in Figs. 2 and 5. As shown in Figs. 2 and 5, this insulation unit 13 comprises a sheet of suitable material 14, preferably flexible fabric, such as paper, having a highly reflective surface, the sheet of material 14 being corrugated or indented at spaced intervals, as shown, to provide a plurality of substantially parallel hollow ribs 15, the crests of which extend outwardly from the reflective surface. This highly reflective surface may be nonmetallic or it may be metallized, the surface of the embodiment shown comprising a sheet of very thin metal foil 16, preferably aluminum foil, adhesively secured to the paper sheet 14 (Fig. 5).

It will be observed that the ribs 15 are relatively shallow and narrow and are so spaced that the flat portions 17 extending between the ribs constitute the major portion of the reflective surface. This preferred construction of the ribs 15 constitutes what I consider an important feature of my invention, as will be more fully explained hereinafter. Adjacent the surface of the sheet 14 opposite from the metal foil 16 is a backing member 18 adhesively secured to the flat portions 17. This backing member 18, which may be formed of any suitable material, such as heavy paper, extends, as shown, across the base of each of the hollow ribs 15 so as to form a brace for the ribs and thus prevent lateral stretching of the sheet 14 and transverse deformation of the ribs 15.

Disposed adjacent the opposite surface of the backing sheet 18 is a thick body or mat 19 of insulating material having a low heat conductivity. This body 19 may be formed of any suitable light porous insulating material and is preferably a fluffy fibrous material, such as so-called glass wool which consists of a resilient homogeneous fibrous bat, flocculent or cotton-like in structure, in which the individual fibers are non-combustible and substantially impervious to moisture. This body or mat 19 is adhesively secured to the backing member 18 so as to be substantially supported thereby.

The insulation unit 13 may be installed in the wall structure and positioned as shown in Figs. 1, 3, and 4 before either of the covering members 11 and 12 is applied to the studding 10, but the insulation unit is preferably applied after the outer covering 12 and before the inner covering 11 has been secured to the studding. The inner covering 11 may be any suitable type of plaster-receiving material and is here shown as constituting a well known type of wallboard having a core of gypsum or other hydrated composition and covering sheets of paper. Likewise, the outer covering 12 may be formed of sheathing or of any other suitable structural elements.

As shown in Figs. 1, 2, and 3, the backing member 18 and the foil coated sheet 14 extend outwardly beyond the edges of the body 19 to form mounting flanges 20 for the unit 13, and the unit 13 may thus be positioned in the hollow wall spaces simply by securing the flanges 20 to the inner faces of the studding 10, for example, by suitable nails or tacks 21, as shown in Fig. 3. In securing these flanges to the studding 10, sufficient slack is left in the corrugated sheet 14 and the backing member 18 to permit flush mounting of the cover member 11 on the studding 10 over the mounting flanges 20. If desired, the flanges 20 may be previously creased (Fig. 3) so as to position the crests of the ribs 15 substantially flush with the flange surfaces to which the covering member 11 is to be secured.

Thus, in the assembled wall structure, the crests of the ribs 15 engage the surface of the covering member 11 at spaced intervals and maintain the major portion of the metal foil 16 in spaced relation with the covering member 11 so as to form a plurality of relatively narrow flat air spaces therebetween, the flat portions 17 being uniformly spaced from the covering and extending substantially parallel thereto. Furthermore, the hollow ribs 15 form additional dead air spaces, and the body 19 of porous insulation material substantially fills the hollow space between the backing member 18 and the outer covering member 12 so as to provide, in conjunction with the foil-coated, corrugated member, the maximum degree of insulation obtainable.

It will be understood by those skilled in the art that the highly reflective foil surface, which is an efficient reflector and a low emitter of radiant energy, is highly effective in preventing the transmission of heat by radiation in either direction through the wall, and the porous body 19 is highly effective in minimizing the transfer of heat by conduction and convection. The shallow narrow dimensions of the ribs 15 and the spacing of the ribs effect uniform spacing of the major portion of the reflective surface from the wall covering in parallel relation thereto and thus provide, as pointed out above, relatively narrow dead air spaces and maximum utilization of the reflective qualities of the foil. Furthermore, the ribs 15 insure accurate positioning of the reflective surface with respect to the wall coverings, and the thickness of the insulating body 19 is such that the remainder of the hollow wall space is substantially filled. If the depth of the hollow wall space varies from the standard depth provided by ordinary 2x4 studding, additional porous insulation may be provided in order to obtain the most efficient insulation.

A further important advantage of insulating structures constructed in accordance with my invention resides in the fact that the corrugated foil-covered sheets substantially seal the hollow wall spaces against the entry of moisture through the inner wall, and in the fact that the body 19 permits diffusion of water vapor therethrough to the outer wall. It has been found that with many types of insulation a considerable amount of moisture passes into the wall structure from the room during the winter months, especially when air conditioning means are provided for maintaining a proper degree of humidity in the room. This moisture may condense and freeze in the body of insulation between the walls, and thus the insulating characteristics of the wall are seriously impaired.

By means of the insulating wall structure herein shown and described, the condensation and freezing of moisture in the insulation is substantially minimized or prevented, practically all of the condensation occurring on the surface of the colder wall covering. Thus, the foil-coated corrugated sheet substantially prevents the entry of excess moisture through the higher temperature wall covering to the porous body, and the relatively small amount of water vapor that may be contained in this body due, for example, to infiltration of moisture during the summer months, diffuses through the body 19 toward the colder wall covering and condenses thereon.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

I claim:

1. An insulating wall structure having inner and outer coverings with a hollow space therebetween, a corrugated sheet having a substantially continuous reflective surface integral therewith, means mounting said sheet in said hollow space with the crests of said corrugations on said reflective surface contacting one of said coverings at spaced intervals to provide dead air spaces between said covering and the major portion of said reflective surface, a body of light, porous heat insulating material, and means adhesively securing said body to the surface of said sheet opposite said reflective surface substantially to fill said hollow space.

2. An insulating wall structure having inner and outer coverings with a hollow space therebetween, a substantially continuous corrugated sheet of metallic foil having a reflective surface mounted in said hollow space with the crests of the corrugations contacting one of said coverings at spaced intervals to provide air spaces enclosed by said covering and the major portion of the reflective surface of said metallic foil, and a thick porous mat of mineral wool adhesively secured to the opposite surface of said metallic foil substantially filling said hollow space.

3. An insulating wall structure having inner and outer coverings with a hollow space therebetween, a corrugated sheet having a reflective surface, means mounting said sheet in said hollow space with the crests of said corrugations on said reflective surface contacting one of said coverings at spaced intervals to provide dead air spaces between said covering and the major portion of said reflective surface, a backing member adhesively secured to the opposite surface of said corrugated sheet and extending across the base of each corrugation to prevent transverse deformation of said corrugations, a body of light porous heat insulating material, and means adhesively securing said body to the opposite surface of said backing member substantially to fill said hollow space.

4. An insulating wall structure having inner and outer coverings with a hollow space therebetween, a corrugated sheet of metallic foil having a reflective surface mounted in said hollow space with the crests of the corrugations contacting one of said coverings at spaced intervals to provide air spaces between said covering and the major portion of the reflective surface of said metallic foil, a backing member adhesively secured to the opposite surface of said metallic foil between said corrugations and extending across the base of each corrugation to prevent transverse deformation of said corrugations, and a thick porous mat of glass wool adhesively secured to the opposite surface of said backing member and substantially filling said hollow space.

5. An insulating wall structure having inner and outer coverings with a hollow space therebetween, a sheet of material having a substantially continuous reflective surface integral therewith, said sheet being indented at spaced intervals to provide a plurality of substantially parallel ribs integral with said reflective surface, the portions of said reflective surface between said ribs being substantially flat and constituting the major portion of said surface, means mounting said sheet in said hollow space with the crests of said ribs engaging one of said coverings whereby a major portion of said reflective surface is spaced from said covering and extends substantially parallel thereto, and a body of light porous heat insulating material adhesively secured to the opposite surface of said sheet and substantially filling said hollow space.

6. An insulating wall structure having inner and outer coverings with a hollow space therebetween, a sheet of material having a reflective surface, said sheet being indented at spaced intervals to provide a plurality of hollow substantially parallel ribs, the crests of which extend outwardly from said reflective surface, the portions of said reflective surface between said ribs being substantially flat and constituting the major portion of said surface, a backing member adhesively secured to the opposite surfaces of said flat portions and extending across the base of each of said hollow ribs to prevent transverse deformation thereof, means mounting said sheet and said backing member in said hollow space with the crests of said ribs engaging one of said coverings whereby said major portion of said reflective surface is spaced from said covering and extends substantially parallel thereto, and a body of light porous heat insulating material adhesively secured to said backing member and substantially filling said hollow space.

7. An insulating wall structure having inner and outer coverings with a hollow space therebetween, one of said coverings being subjected to higher temperatures than the other, a sheet of metallic foil having a highly reflective surface, said sheet being indented at spaced intervals to provide a plurality of hollow substantially parallel ribs, the crests of which extend outwardly from said reflective surface, the portions of said reflective surface between said ribs being substantially flat and constituting the major portion of said surface, a backing member adhesively secured to the opposite surfaces of said flat portions and extending across the base of each of said hollow ribs to prevent transverse deformation thereof, means mounting said metallic foil and said backing member in said hollow space with the crests of said ribs engaging said higher temperature covering whereby said major portion of said reflective surface is uniformly spaced from said higher temperature covering in substantially parallel relation thereto and said hollow space is substantially sealed against the entry of moisture through said higher temperature covering, and a body of porous mineral wool adhesively secured to said backing member and substantially filling said hollow space, said body permitting ready diffusion of water vapor therethrough to the lower temperature covering whereby substantially all condensation of the water vapor contained in said wall takes place on said lower temperature covering.

8. A heat insulating unit for a wall structure comprising a substantially continuous sheet of material having a reflective surface integral therewith, said sheet being indented at spaced intervals to provide a plurality of substantially parallel ribs on said reflective surface, the portions of said surface between said ribs being substantially flat and constituting the major portion of said reflective surface, and a thick body of light porous insulating material adhesively secured to the surface of said sheet opposite said reflective surface.

9. A heat insulating unit for a wall structure comprising a substantially continuous sheet of metallic foil, said sheet being indented at spaced intervals to provide a plurality of substantially parallel hollow ribs the crests of which extend outwardly from one surface of said metallic foil, the portions of said surface between said ribs being substantially flat and constituting the major portion of said surface, and a thick body of light porous insulating material adhesively secured to the opposite surface of said metallic foil.

10. A heat insulating unit for a wall structure comprising a sheet of material having a reflective surface, said sheet being indented at spaced intervals to provide a plurality of substantially parallel ribs on said reflective surface, the portions of said surface between said ribs being substantially flat and constituting the major portion of said reflective surface, a backing member adhesively secured to the opposite surfaces of said flat portions and extending across the base of each of said ribs to prevent transverse deformation thereof, and a thick body of light porous insulating material adhesively secured to the opposite surface of said backing member.

11. A heat insulating unit for a wall structure comprising a sheet of metallic foil having a highly reflective surface, said sheet being indented at spaced intervals to provide a plurality of substantially parallel hollow ribs, the crests of which extend outwardly from said reflective surface, the portions of said surface between said ribs being substantially flat and constituting the major portion of said surface, a backing member adhesively secured to the opposite surfaces of said flat portions and extending across the base of each of said hollow ribs to prevent transverse deformation thereof, and a thick mat of porous mineral wool adhesively secured to the opposite surface of said backing member.

FRED GERALD JOHNSON.